Patented May 19, 1936

2,041,305

UNITED STATES PATENT OFFICE 2,041,305

PROCESS FOR THE PREPARATION OF A PLASTIC VULCANIZABLE MATERIAL FROM RUBBER, GUTTA-PERCHA, BALATA, AND THE LIKE

Martinus Joännes Stam, The Hague, Netherlands

No Drawing. Application January 12, 1934, Serial No. 706,445. In the Netherlands September 25, 1933

2 Claims. (Cl. 106—23)

This invention relates to a process for the preparation of a plastic vulcanizable material from rubber, gutta-percha, balata and the like.

In my earlier British Patent 388,341 I have disclosed the manufacture of a dry, non-adhesive, non-vulcanized powder, consisting of very fine particles of pure rubber, gutta-percha, balata or similar substances, coated by a layer of a protective substance which prevents the agglomeration of the particles.

In said patent specification 388,341, page 1, lines 30–33, I also disclosed that "such pulveriform rubber is adapted to be dispatched and worked up in a much more advantageous manner than when it is in a spongy or sticky nature". Nothing is said, however, about the manner of working up this powder. At that time in the year 1932 I considered only two manners of working up, in the first place the ordinary manner of making in the first step a sheet in an ordinary milling machine and mixing that in the usual way with vulcanizing agents, fillers, etc. as generally employed in the rubber industry. It was supposed that the milling would be easier than in the ordinary process. In the second place I considered a process in which the powder, which may be fixed with vulcanizing agents, dry fillers, coloring matters or the like is worked up into a paste with a liquid, such as water, which does not dissolve the rubber, applying this paste to an article or surface and vulcanizing this paste together with its support to obtain a rubber coated or covered object. With this process, however, it was impossible to make solid objects without support of this material.

Moreover in the earlier process the fillers, vulcanizing agents and accelerators did not form a completely homogeneous mixture with the powder when mixed in dry state and the protective colloids added to the powder also appeared to dissolve in certain liquids—for instance water—thus causing an agglomeration of the rubber particles.

This is eliminated completely by the present invention, which comprises a process for the preparation of a plastic, vulcanizable material from non-adhesive pulverulent non-vulcanized rubber, gutta-percha, balata or the like, characterized in that additional substances such as fillers, vulcanizing agents and accelerators are added and mixed with the powder in a dry state and the mixture is then rendered plastic by rolling, kneading or pressing, and is then moulded and vulcanized.

The rubber-particles are softened by first mixing them in a dry state with the additional substances and then rolling and kneading the mixture whereby the additional substances are completely absorbed. The additional substances such as fillers or the like may be first emulsified or dispersed in a liquid.

The emulsion may then be mixed with the powder by rolling or kneading or may be sprayed into the powder. In the latter case the powder itself may be atomized or sprayed so that the particles of the powder come into intimate contact with the particles of the emulsion. The materials may be sprayed in the same or in opposite directions. The powder is thus softened but is still incoherent so that the particles remain separated as the protective colloid is not dissolved from the particles. The powder may then be pressed into any shape under a comparatively low pressure only, after which it may be vulcanized.

Pastes or latex-like solutions or suspensions of non-coherent, pulverulent, non-vulcanized rubber, gutta-percha, balata or the like may be used, which are obtained by preparing a plastic pasty mass either by rolling, kneading or the like or by adding liquids which make the powder swell but which do not dissolve any protective colloid which has been added to the powder, or by both kneading and adding liquids. Water or other liquid is then added to the paste by means of an additional dispersing or emulsifying agent, in order to obtain the desired substance. By using these pastes or latex-like solutions or suspensions an intensive mixing may be obtained.

A layer may be precipitated in the known manner from the latex-like solutions or suspensions either chemically or electrolytically or by filtration or other mechanical treatment.

When using pastes, any kinds of coarse or cheap fillers may be used, which will make the material cheaper. The pastes may also be applied to a fibrous material or to metals, or animal, vegetable or mineral fibres or metals may be passed through it, so as to reinforce the material.

In order to prevent the material being vulcanized from bubbling by reason of the powder swelling with volatile substances, the pulverulent rubber may be mixed with a granular material in a dry state, which granular material melts at a temperature equal to or lower than the vulcanization temperature and then makes the rubber particles swell and renders them plastic.

For this purpose a substance which, when molten, will dissolve sulphur and act as follows, can be used.

The substance is first melted and the necessary quantity of sulphur is then added whereupon the mixture is cooled and allowed to solidify. The product is extremely fine, and is added to the pulverulent rubber and mixed in dry state with the desired fillers and the like. By the addition of sulphur an extremely rapid and direct vulcanization is obtained in a very short time. An example of a substance of this kind is naphthalene, which melts at a temperature of 83 degrees C. and dissolves the sulphur in any proportion and also makes the rubber particles swell and become plastic.

This process makes it possible to make rubber articles from a powder, which while being prepared by pressing and heating in a dry state, is also moulded and vulcanized so that the finished article can be removed from the press after a very short time.

What I claim and desire to secure by Letters Patent is:—

1. Process for the preparation of a vulcanizable material from non-adhesive, pulverulent, non-vulcanized rubber, obtained by spray-drying latex with a substance which protects the dry particles against agglomeration; characterized in that to the rubber powder a dry powder is added containing naphthalene.

2. A process according to claim 1, in which the naphthalene contains sulphur dissolved into it.

MARTINUS JOÄNNES STAM.